(12) United States Patent
Jaradi et al.

(10) Patent No.: US 10,518,742 B2
(45) Date of Patent: Dec. 31, 2019

(54) LOAD LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 240 days.

(21) Appl. No.: 15/664,223

(22) Filed: Jul. 31, 2017

(65) Prior Publication Data
US 2019/0031136 A1    Jan. 31, 2019

(51) Int. Cl.
*B60R 22/36* (2006.01)
*B60R 22/34* (2006.01)
*B60R 22/46* (2006.01)
*F16D 41/12* (2006.01)

(52) U.S. Cl.
CPC ............ *B60R 22/36* (2013.01); *B60R 22/341* (2013.01); *B60R 22/46* (2013.01); *F16D 41/12* (2013.01)

(58) Field of Classification Search
CPC ........ B60R 22/36; B60R 22/46; B60R 22/341
See application file for complete search history.

(56) References Cited

U.S. PATENT DOCUMENTS

| 5,636,806 | A | 6/1997 | Sayles |
| 6,739,541 | B2 | 5/2004 | Palliser et al. |
| 8,006,927 | B2 | 8/2011 | Heitkamp |
| 9,327,937 | B2 | 5/2016 | Gormley |
| 2008/0265080 | A1* | 10/2008 | Braun .................... B60R 22/46 242/382 |
| 2012/0234958 | A1* | 9/2012 | Stroik, Jr. ............. B60R 22/341 242/379.1 |

FOREIGN PATENT DOCUMENTS

DE    102008042020 A1    3/2010

* cited by examiner

*Primary Examiner* — Sang K Kim
(74) *Attorney, Agent, or Firm* — Frank A. Mac Kenzie; Bejin Bieneman PLC

(57) ABSTRACT

A seatbelt retractor includes a spool, a piston, and a cylinder. The spool is rotatably coupled to a base by a piston and a cylinder. The piston is fixed to one of the base and the spool. The cylinder receives the piston and is fixed to the other of the base and the spool. A cutter is disposed between and fixed to one of the piston and the cylinder. The cutter is in engagement with the other of the piston and the cylinder.

20 Claims, 6 Drawing Sheets

LOAD LIMITING SEATBELT RETRACTOR

BACKGROUND

A seatbelt system may include a retractor for paying out seatbelt webbing. The retractor includes a spool around which the webbing is wrapped. The webbing unwinds from the spool when the webbing is buckled by the seat occupant. In the event of a vehicle impact, the spool is locked, preventing its rotation and preventing any further unwinding of the webbing. The sudden locking, in combination with an inertia of the occupant, may result in a resistive load of the webbing against the occupant sufficient to cause occupant discomfort. A load limiting mechanism within the retractor allows a cushioned termination of the webbing travel to reduce such discomfort. A known load limiting mechanism includes a torsion bar disposed in a center of the spool. The torsion bar may be a cylindrical bar of steel having a yield strength selected to allow the bar to torsionally yield at a value associated with a potential threshold of discomfort. Twisting of the torsion bar absorbs some of the inertia energy, thereby reducing the load sustained by the occupant against the webbing. The torsion bar, when plastically deformed, may yield in a non-linear manner that may be difficult to duplicate. It is desired to provide an improved load limiting mechanism.

DETAILED DESCRIPTION

Figure 1:
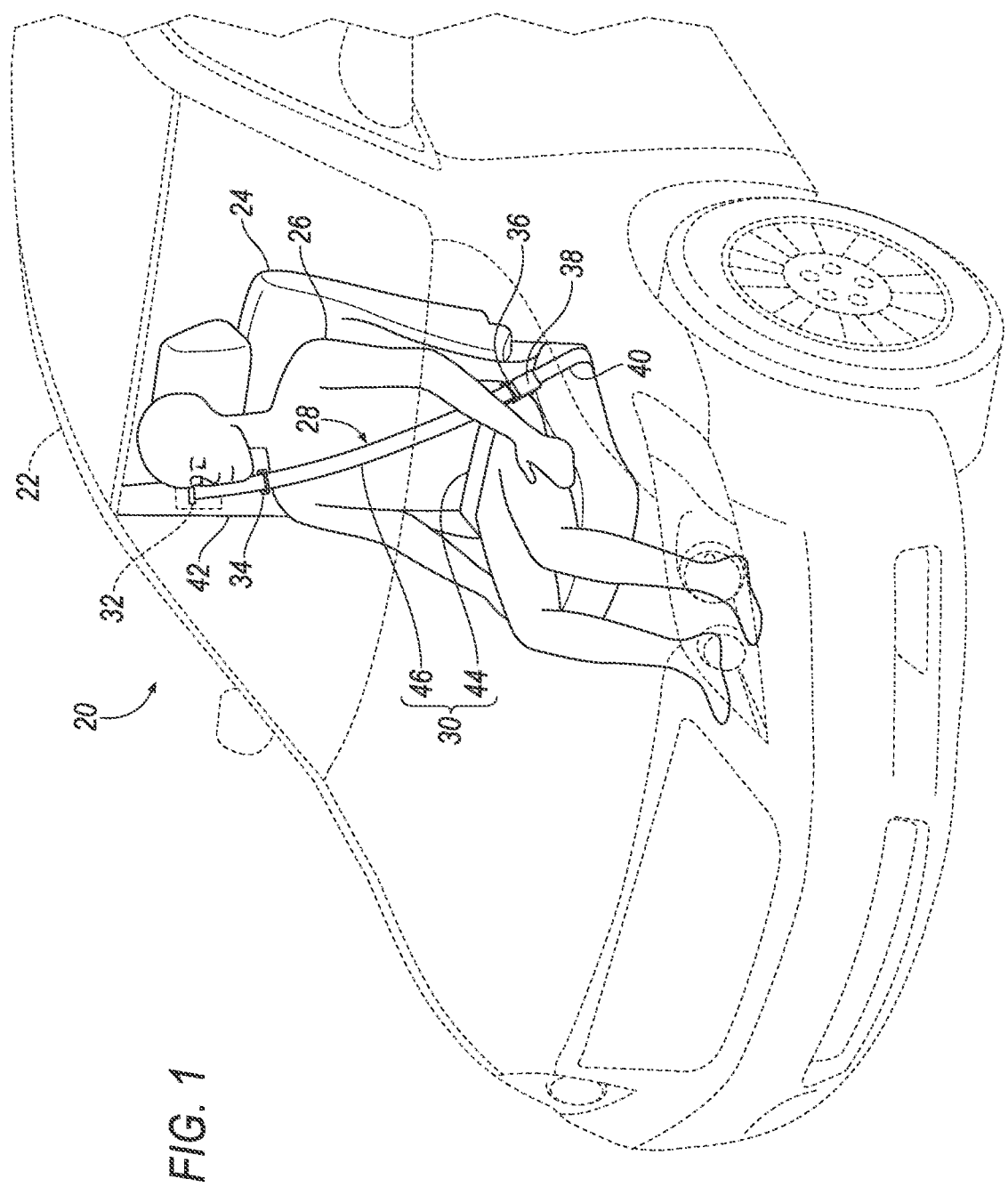
FIG. 1 is a perspective view of a vehicle occupant with an example seatbelt system.
Figure 2:
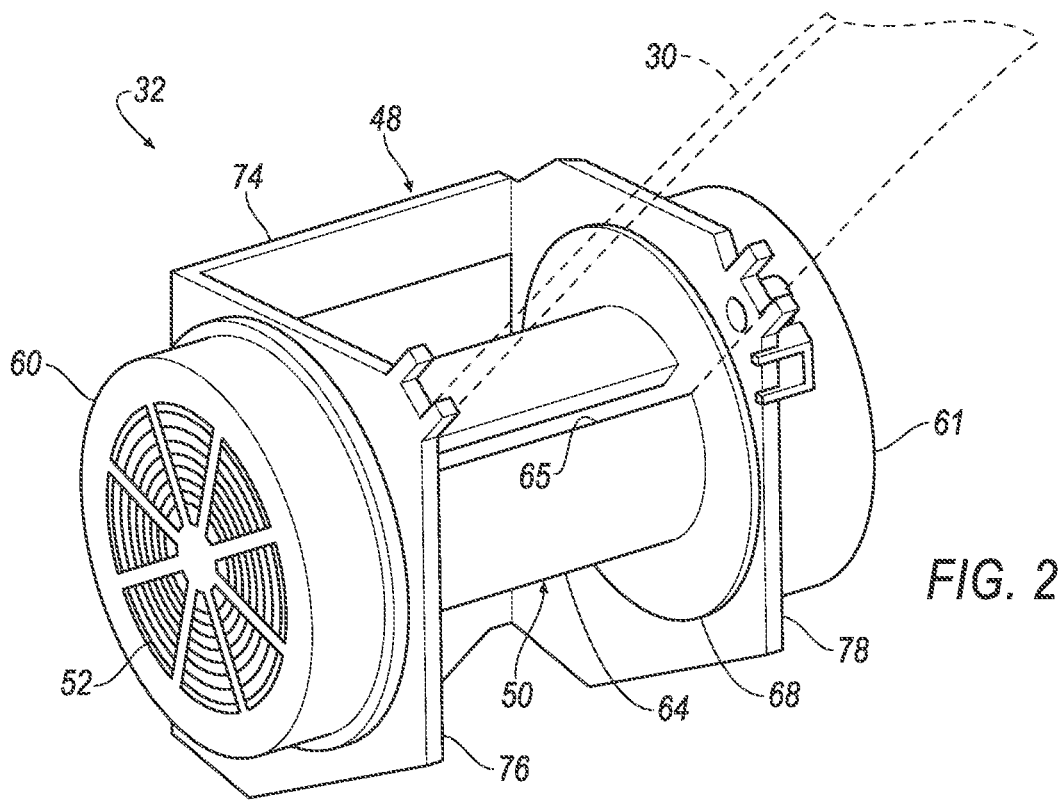
FIG. 2 is a first perspective view of an example retractor.
Figure 3:
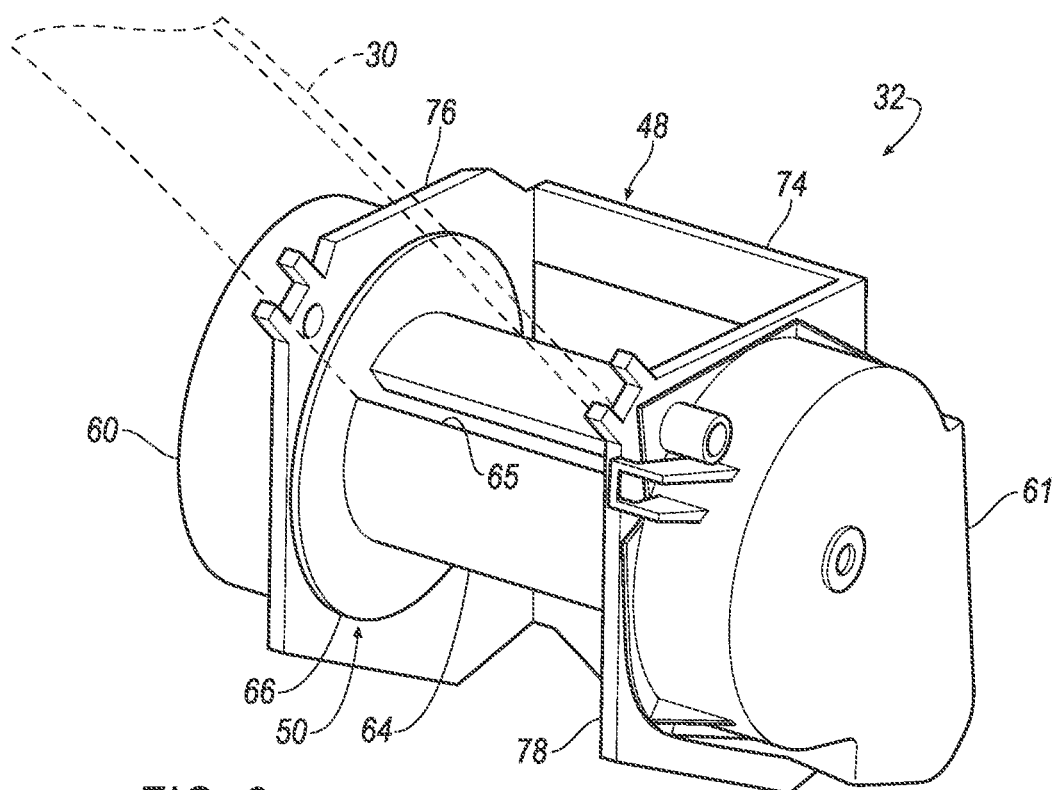
FIG. 3 is a second perspective view of the example retractor of FIG. 2.
Figure 4:
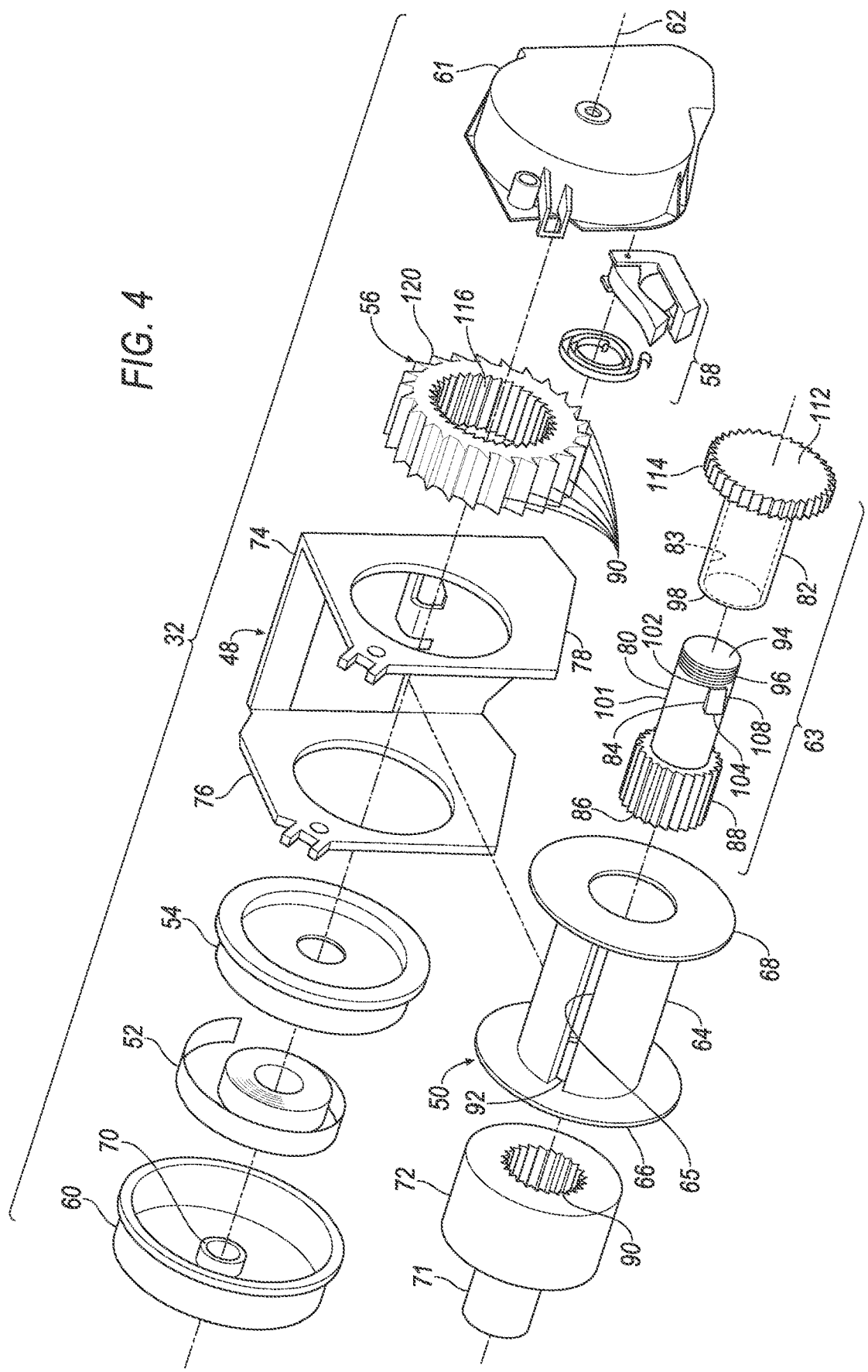
FIG. 4 is an exploded view of the example retractor of FIGS. 2 and 3.
Figure 5:
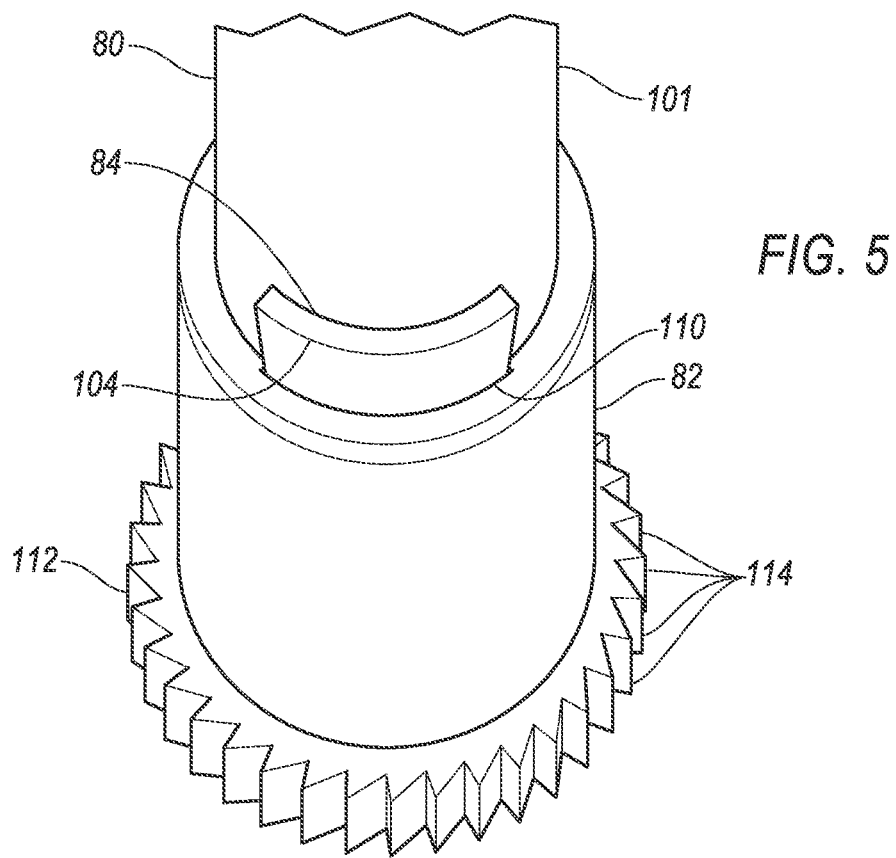
FIG. 5 is an enlarged perspective view of an example energy absorber of the example retractor of FIG. 4.
Figure 6:
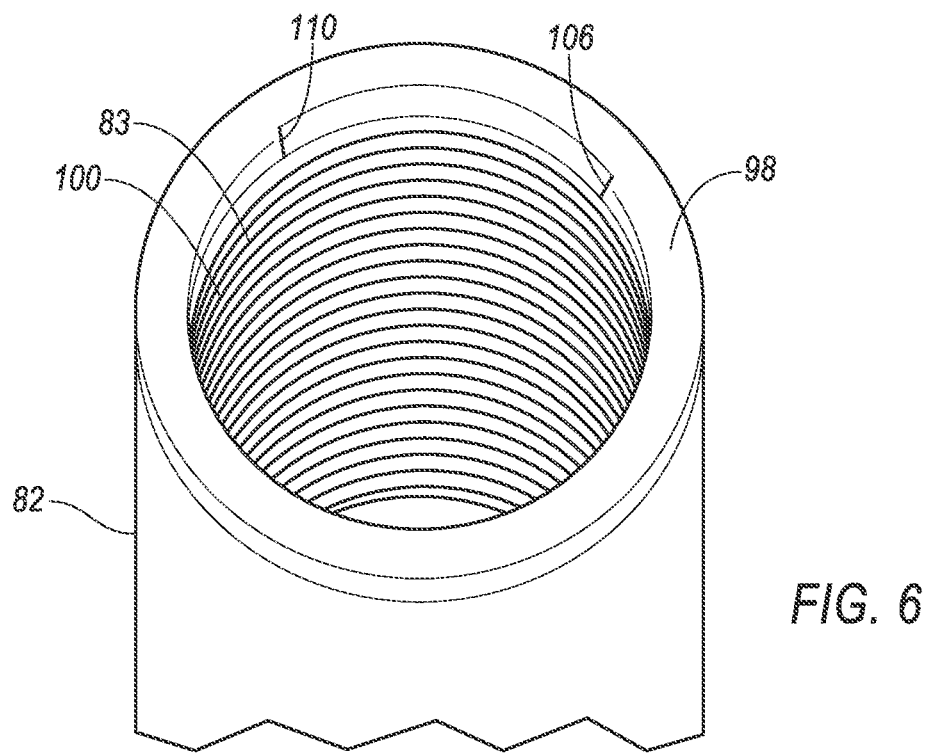
FIG. 6 is an enlarged perspective view of an example cylinder of the example energy absorber of FIG. 5.
Figure 7:
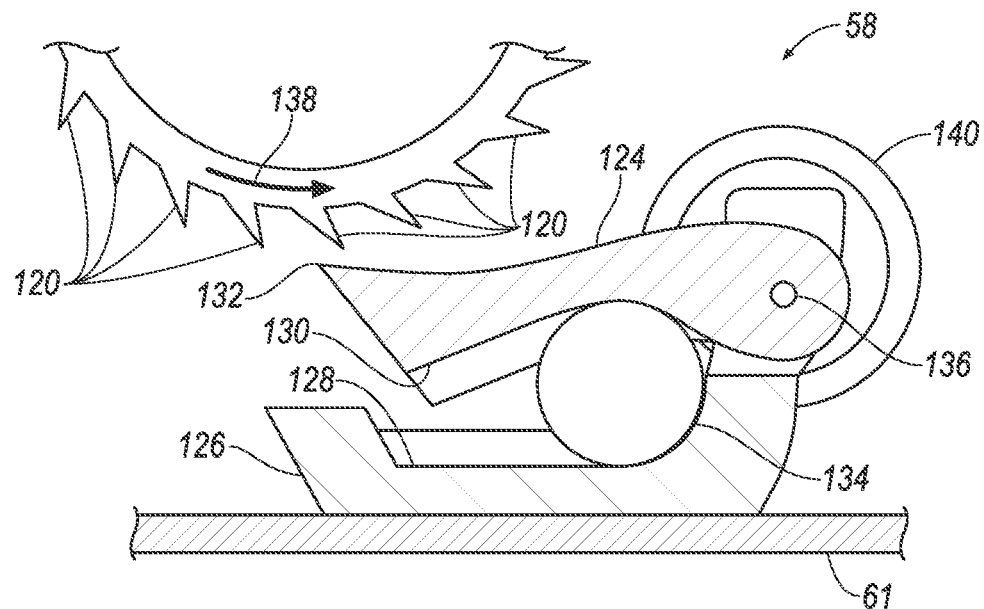
FIG. 7 is a sectional side view of an engagement mechanism in a non-impact condition.
Figure 8:
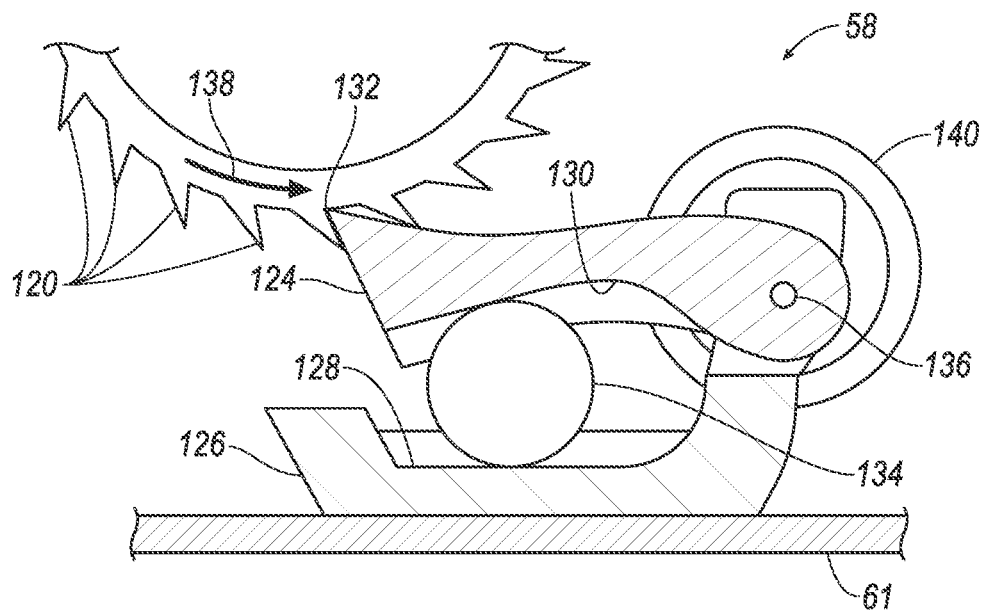
FIG. 8 is a sectional side view of the engagement mechanism of FIG. 7 in an impact condition.

Relative orientations and directions (by way of example, upper, lower, bottom, forward, rearward, front, rear, back, outboard, inboard, inward, outward, lateral, left, right) are set forth in this description not as limitations, but for the convenience of the reader in picturing at least one embodiment of the structures described. Such example orientations are from the perspective of an occupant seated in a seat, facing a dashboard. In the Figures, like numerals indicate like parts throughout the several views.

A seatbelt retractor includes a spool, a piston, and a cylinder. The spool is rotatably coupled to a base by a piston and a cylinder. The piston is fixed to one of the base and the spool. The cylinder receives the piston and is fixed to the other of the base and the spool. A cutter is disposed between and fixed to one of the piston and the cylinder. The cutter is in engagement with the other of the piston and the cylinder.

The seatbelt retractor may include a housing and a base lock. The housing may have the spool rotatably coupled thereto for relative rotation of the spool thereto about an axis of rotation defined by the spool. The base lock disposed between the base and a housing, the base lock in a first condition fixing the base to the housing.

The base lock of the seatbelt retractor may include a plurality of clutching teeth and an engagement tooth. The plurality of clutching teeth may be disposed on an outer circumference of the base for rotation therewith. The engagement tooth may be connected to the housing. The engagement tooth in the first condition may be in engagement with the clutching teeth. The engagement tooth in a second condition may not be in engagement with the clutching teeth. Engagement of the engagement tooth with the clutching teeth rotatably fixes the cylinder to the base.

The piston may have piston threads, and the cylinder may include a bore receiving the piston. The bore may have cylinder threads inside the bore. The piston threads and the cylinder threads may be in threaded engagement with each other.

The piston threads may be formed at a first end of the piston and the cutter may be disposed on the piston between the piston threads and a second end of the piston.

The cutter may be fixed to the piston and may cut the cylinder with relative rotation between the cylinder and the piston.

The cutter may have a wedge-shaped cross section with a thinner first end disposed at the cylinder and a wider second end opposite the first end.

The cylinder may be connected to the base and the piston may be connected to the spool.

An end cap may be rotatably fixed to the spool and to an end of the piston.

The end cap may be rotatably supported by a spring cover.

The end cap may have splines complementary to splines on the second end of the piston.

The base may have splines complementary to splines on an end of the cylinder.

A seatbelt retractor may include a spool, a housing, a base lock, and an energy absorber. The spool may be rotatably connected with a base by an energy absorber. The housing may have the spool rotatably coupled thereto for relative rotation of the spool thereto about an axis of rotation defined by the spool. The base lock may be disposed between the base and a housing. The base lock, in a first condition, may fix the base to the housing. The energy absorber may include a piston, a cylinder and a cutter. The piston may be fixed to one of the base and the spool. The cylinder may receive the piston and may be fixed to the other of the base and the spool. The cutter may be disposed between and fixed to one of the piston and the cylinder and in engagement with the other of the piston and the cylinder.

An example restraint system 20, as illustrated in FIGS. 1-15, may be disposed in a vehicle 22. The vehicle 22 includes a seat 24 that may support an occupant 26 of the vehicle 22. The seat 24 may be a front seat or a rear seat, and may be in any cross-vehicle position. The seat 24 shown in FIG. 1 is a bucket seat, but alternatively the seat 24 may be a bench seat or another type of seat. The occupant 26 may be an adult or adolescent, or may alternatively be a child car seat for supporting an infant or young child. The position and orientation of the seat 24 and components thereof may be adjustable by the occupant 26.

The restraint system 20 includes an example seatbelt system 28 and may also include an airbag system (not shown). The illustrated seatbelt system 28 is a three-point system. By three-point, it is meant that a seatbelt, i.e., a webbing, 30 of the system 28 restrains the occupant 26 at three points: at a shoulder, in the example of FIG. 1 the right shoulder, and on both sides of the occupant's lap.

The seatbelt system 28 may include, in addition to the seatbelt 30, a retractor 32, a D-ring 34, a seatbelt latch plate 36, an anchor (not shown), a buckle 38, and a buckle mount 40. The seatbelt system 28 may, alternatively, include another arrangement of attachment points. The seatbelt system 28, when fastened, retains the occupant 26 on the seat 24, e.g., during sudden decelerations of the vehicle 22.

The retractor 32 receives and dispenses a first end of the seatbelt 30. The retractor 32 may be fixed, as illustrated, to the vehicle structure, e.g., to a B-pillar 42, or alternatively, to a frame of the seat 24. An alternative vehicle structure location includes a floor of the vehicle 22.

The D-ring 34 provides a consistent orientation of the seatbelt 30 across the occupant's shoulder, e.g., in a back of the seat 24. The D-ring, when included, receives the seatbelt 30 and directs the seatbelt 30 from the retractor 32 across the shoulder of the occupant 26. The D-ring may be fixed to the back of the seat, or, alternatively, to a structural component of the vehicle, e.g. a B-pillar 42. When the retractor 32 is mounted to one of the B-pillar 42 and the seat frame, the D-ring 34 may be omitted from the system 28.

The seatbelt latch plate 36, i.e., a clip, selectively engages the buckle 38 on an inboard side of the occupant 26. The latch plate 36 is received by a slot 45 in the buckle. The buckle 38 is fixed to the vehicle structure or to the seat frame by the buckle mount 40.

The seatbelt anchor may be in the form of an anchor plate (not shown) and may be disposed on an outboard side of the seat 24. The plate is fixed to a second end of the seatbelt 30 opposite the retractor 32 and is also fixed to one of the frame of the seat 14 and the structure of the vehicle 12 to thereby fix the second end of the seatbelt 30.

The latch plate 36 slides freely along the seatbelt 30 and, when engaged with the buckle 38, divides the seatbelt 30 into a lap band 44 and a shoulder band 46. The lap band 44 is disposed between the latch plate 36 and the anchor. The shoulder band 46 may be disposed between the latch plate 36 and the D-ring 34.

With reference to the FIGS. 2-8 the example retractor 32 includes a housing 48, a spool 50, a retractor spring 52, a disc 54, a base 56, a base lock 58, a spring cover 60, and a lock cover 61. The spool 50 is rotatably coupled to the housing 48 for relative rotation thereto about an axis of rotation 62 defined by the spool. The spool 50 is rotatably connected with, i.e., rotatably fixed for rotation with, the base 56 by an energy absorber 63.

The lock cover 61 is fixed to the housing 48 at the second end of the spool 50 and is disposed over the base 56 and the lock 58. The illustrated lock 58, best shown in FIGS. 7 and 8, may include components fixed to either the housing 48 or the lock cover 61.

The spool 50 may freely rotate relative to the housing 48. The first end of the seatbelt 30 is connected to the spool 50. The spool 50 includes a hub 64 that may be cylindrical in shape and centered on the axis 62. The spool 50 may be adapted to receive the seatbelt 30, for example, by including a webbing attachment slot 65 and permitting the seatbelt 30 to wind around the hub 64 of the spool 50.

The seatbelt 30 may be attached to the spool 50. Specifically, one end of the seatbelt 30 may be attached to the seatbelt anchor, and another end of the seatbelt 30 may be attached to the spool 50, with the seatbelt 30 wound around the spool 50 beginning at that end. The seatbelt 30 may be formed of a fabric in the shape of a strap.

The spool 50 may include a first flange 66 at a first end of the hub 64 and a second flange 68 at a second end of the hub 64. The flanges 66, 68 may provide a border for the seatbelt 30, helping to maintain the layers or wraps of the seatbelt 30 over the hub 64 in alignment with each other.

The retractor spring 52 rotatably biases the spool 50 relative to the housing 48. The retractor spring, as noted above, may extend from the housing 48 to the spool 50 either directly or indirectly, e.g., through the disc 54 and the cover 60. The retractor spring 52 may be loaded in tension or compression when the seatbelt 30 is fully retracted, and the retractor spring 52 may be further loaded in either tension or compression when the seatbelt 30 is extended from the spool 50. Thus, the retractor spring 52 may exert a force tending to retract the seatbelt 30. The retractor spring 52 may be a spiral torsion spring or any other suitable type of spring. The spring cover 60 is fixed to the housing 48 at a first end of the spool 50, provided by the first hub flange 66, and is disposed over the disc 54 and the spring 52. The spring cover 60 may include a support cylinder 70 that receives a spindle portion 71 of an end cap 72 for rotatable support of the spool 50.

The housing 48 may be formed of stamped sheet steel or other suitably rigid material, e.g., plastic. The housing 48 may include a center portion 74 connecting a first wing 76 and a second wing 78. The first wing 76 and the second wing 78 are on opposite sides of the center portion 74 and face each other. The wings 76, 78 receive the spool 50, with the flanges 66, 68 being disposed between the wings 76, 78. The housing 48 may be mounted to a structural element of the vehicle 22, e.g., to the B pillar 42 in the instance the seat 24 is a front seat, to a C pillar (not shown) when the seat 24 is a rear seat, or may be mounted to the seat 24.

The energy absorber 63 includes a piston 80, a cylinder 82 and a cutter 84. The piston 80 is fixed to one of the base 56 and the spool 50. The cylinder 82 is fixed to the other of the base 56 and the spool 50. The cylinder 82 has a threaded bore 83 that threadingly receives the piston 80. The cutter 84 is disposed between and fixed to one of the piston 80 and the cylinder 82. The cutter 84 is in engagement with the other of the piston 80 and the cylinder 82.

The spool 50 is, as noted above, rotatably coupled to the housing 48 for relative rotation thereto. The piston 80 is fixed on a first end 86 to the end cap 72 for rotation therewith. The end cap 72 may be rotatively fixed to the first end 86 by axially oriented outer splines 88 on the first end 86 that may be received by complementary inner splines 90 formed inside of the end cap 72.

A first hub flange 66 may include an aperture 92 having splines (not shown) complementary to the outer splines 88, facilitating the unitary rotation of the spool 50, the end cap 72, and the piston 80. The example disc 54 may be fixed to the first hub flange 66 for rotation with the spool 50.

A second end 94 of the piston 80 has threads 96, i.e., piston threads, thereon. The second end 94 is threaded into a first end 98 of the cylinder 82 which has receiving threads 100, i.e., cylinder threads, on an inside diameter complementary to the threads 96. The piston threads 96 may be in threaded engagement with the cylinder threads 100. A shank 101 of the piston 80 between the threads 96 and the second end 94 may have an outside diameter equal to or less than a minor diameter of the threads 96 to allow the piston 80 to thread into the cylinder bore 83 to a depth greater than the threads 96.

The cutter 84 has a wedge-shaped cross-section, with a first end 102 disposed at the cylinder. The cutter 84 tapers in thickness from the first end 102 to a second end 104 opposite the first end 102. The second end 104 is thicker than the first end 102. The cutter 84 may be fixed to the piston 80, and may have its first end 102 disposed in a chamfer 106 formed in the cylinder 82. A first cutting edge 108 of the cutter 84 is in engagement with the cylinder 82 at a location where cutting may be initiated. The chamfer 106 may extend entirely around a periphery of the inner diameter of the cylinder 82. The chamfer 106 may alternatively be limited to a notch 110 in the inner diameter of the cylinder 82. The cutter 84 may also have a second cutting edge defined by the first end 102. Alternatively, the first end 102 may be angled to be parallel to the threads, or at a yet smaller angle, so that the first end 102 does not cut. As a further alternative, the cutter 84 may be fixed to the inside diameter of the cylinder 82, with the thin end 102 disposed in a chamfer of an outside diameter of the piston 80. Rotation between the piston 80 and the cylinder 82 would remove material from the piston 80. Yet alternatively, the piston 80 could be provided with an outward taper, and the cutter 84 could be fixed to the cylinder 82. Rotation between the piston 80 and the cylinder 82 would bring the cutter 84 into cutting engagement with the tapered portion of the cylinder 82.

The base 56 may be in the form of a disc. The cylinder 82 is fixed on a second end 112 to the base 56 for rotation therewith. The second end 112 may be rotatively fixed to the base 56 by axially oriented outer splines 114 on the second end 112 that may be received by complementary inner splines 116 formed inside of an aperture 118 in the base 56.

The base lock 58 may be any mechanism suited to preventing or restricting rotation of the base 56 or the spool 50 relative to the housing 48. Such mechanisms as lock 58 are known and are commercially available from companies including Autoliv Inc. and ZF Friedrichshafen AG. One type of base lock may engage the cylinder with the housing 48 responsive to a rapid movement of the webbing 30 and an associated rapid spinning of the spool 50. Another type of base lock, consistent with the illustrated base lock 58, may engage the base 56 with the housing 48 responsive to a sudden deceleration or rearward acceleration of the vehicle 22. It is also known to incorporate both types of mechanisms into a single retractor 32. The example base lock 58 is just one approach to engaging the base 56 with the housing 48. The example base lock 58 includes axially extending clutching teeth 120 disposed around an outer circumference of the base 56 and an example base lock 58 that engages the clutching teeth 120 under predetermined conditions.

The base lock 58 may include a pivot arm 124 pivotable relative to a ball retainer 126. The ball retainer 126 includes a first ball track 128, and is fixed relative to the housing 48. The pivot arm 124 includes a second ball track 130 facing the first ball track 128. The pivot arm 124 also includes an engagement tooth 132 on a side opposite the second ball track 130. Via the pivot arm 124, the tooth 132 is connected with the housing 48. In an installed position, the tracks 128, 130 are parallel with a forward direction of motion of the vehicle 22. A ball 134, e.g., a steel ball, is disposed in the tracks 128, 130. A hinge 136, allowing pivotable movement of the pivot arm 124 relative to the ball retainer 126, is at a rear of the tracks 128, 130.

Figure 9:
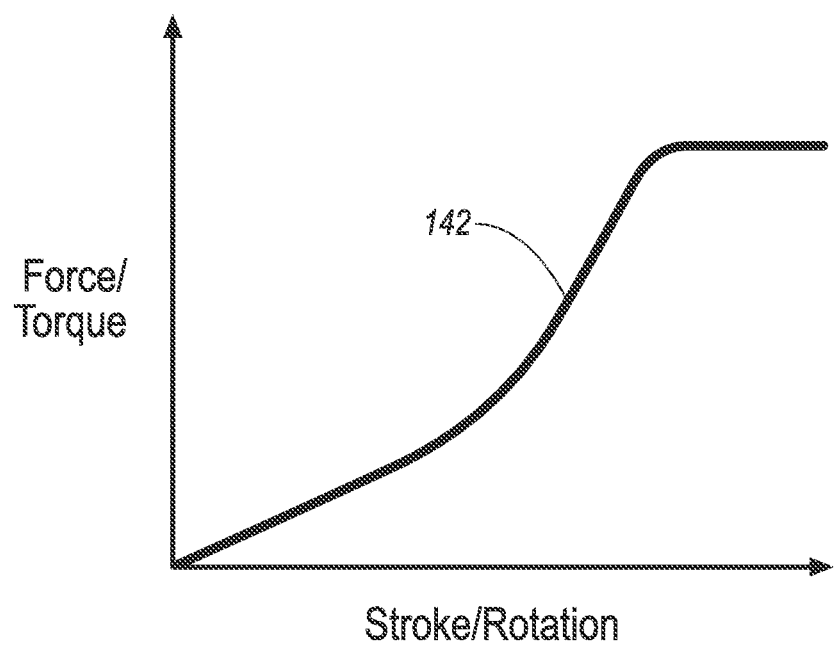
FIG. 9 is a plot of force versus displacement of the energy absorber of FIGS. 2-6.

In a first position, the tooth 132 and the pivot arm 124 are pivoted downwardly, ensuring that there is no engagement between the tooth 132 and the clutching teeth. Also in the first position, associated with the ball 134 being in a rearward position on the tracks 128, 130, as illustrated in FIG. 9, a distance between forward ends of the tracks 128, 130 is less than a diameter of the ball 134. An unwinding direction of rotation of the spool 50 is indicated by an arrow 138. Rotation of the spool 50 in the direction of arrow 138 results in the webbing 30 unwrapping from the spool 50, and being dispensed from the retractor 32.

In a second position, the tooth 132 and pivot arm 124 are pivoted upwardly, toward the base 56 and the tooth 132 into engagement with the clutching teeth 120. In the second position, associated with the ball 134 being in a forward position on the tracks 128, 130, as illustrated in FIG. 10, a distance between forward ends of the tracks 128, 130 is greater than the distance of the first position.

A pivot spring 140 may be disposed between the pivot arm 124 and the ball retainer 126 to bias the pivot arm 124 toward a disengaged position, i.e., an unlocked condition. The biasing of the pivot arm 124 downward may also bias the ball 134 to the disengaged position.

The second ball track 130 has a first portion in a first position relatively proximate to the hinge 136. With the base lock 58 in a locked condition, i.e., with the engagement tooth 132 of pivot arm 124 engaging the clutching teeth 120, the base 56 is fixed relative to the housing 48.

FIG. 9 is a graph of a curve 142 describing an example relationship between a rotative displacement and a rotative force experienced by the energy absorber 63.

The seatbelt retractor 32 operates as described below.

In the event of a frontal impact, the occupant 26 of the front seat 24 has forward momentum relative to the rest of the vehicle 22. Likewise, the ball 134 of the base lock 58 has forward momentum relative to the ball retainer 126 and the pivot arm 124. An associated forward motion of the ball 134 along tracks 128, 130 pivotably displaces pivot arm 124 against the torque of pivot spring 140 and away from retainer 126. The pivoting of pivot arm 124 brings engagement tooth 132 into engagement with the clutching teeth 120 of the base 56, preventing further of the cylinder relative to the housing 48.

The forward inertial motion of the occupant 26, and particularly of the upper torso of the occupant 26, may act against the webbing 30. With rotation of the base 56 prevented by engagement of the tooth 132 with teeth 120, an inertial force of the occupant against the webbing 30, and particularly the shoulder band 46, is resisted by the spool 50 of the retractor 32.

Consistent with the embodiment of FIGS. 5-8, preventing rotation of the base 56 does not immediately prevent rotation of the spool 50 and further dispensing of the webbing 30 from the retractor 32 when the spool 50 is resisting a predetermined magnitude of passenger inertia. Rotation of the spool 50 when the base 56 is locked rotates the piston 80 relative to the cylinder 82, threading the piston 80 deeper into the cylinder 82. The cutter 84 moves with the piston, cutting material from an inner wall of the bore 83, i.e, the inner wall of the cylinder 82, at an interface between the cutting edge 108 and the inner wall of the cylinder 82. When the cutter 84 is wedge shaped and the thinner end 102 leads the cutter 84 into the cylinder 82, an entire axially extending length of the cutting edge 108 disposed within the bore 83 removes material from the inner wall of the cylinder 82. The additional webbing dispensed by the retractor 32 from the spool 50 may be that corresponding to substantially two revolutions of the spool 50 after engagement of the tooth 132 with the teeth 120, e.g., approximately 8-10 inches.

The magnitude of available rotation, and thus an amount of webbing payed out, may be controlled by factors including an inertia energy of the occupant 26 being restrained, a pitch of the threads 96, 100 and an available amount of piston 80 to base 56 travel. Piston 80 to base 56 travel may in turn be affected by additional factors including: a depth of the bore 83, and the geometric characteristics of the cutter 84 determining the depth and length of the cut, including a length of the cutter 84 and the thickness of the cutter 84 at its first and second ends 102, 104, and a width of the cutter 84 and a diameter of the piston 80.

A substantial termination of spool 50 rotation occurs when a torque resulting from the belt force is exceeded by a torque needed by the cutter 84 to remove additional material from the cylinder 82, or alternatively, from the piston 80. Some of the occupant's forward inertia energy is absorbed by the cutter 84 removing material from the inner wall of the cylinder 82, thus reducing the force imparted by the webbing 30 against the occupant 26 when the webbing stops during an incident such as a frontal impact. The curve 142 illustrates one example force versus displacement curve 142, with an initially increasing unit quantity of force needed to obtain a unit quantity of displacement. That the increase may be exponential in appearance is attributable to a combination of the force increasing with a length of a cut and with the depth of the cut. As the cutter 84 progresses from having just its tip, i.e., its first end 102 cutting into the bore, to having an entire length of the cutting edge 108 cutting into the bore, the required cutting force increases with both the increase in length of the cut and the increase in the depth of the cut. The increase in depth results from the greater thickness of the second end 104 relative to the first end 102. The cutting force, as indicated by the curve 142, may reach a plateau when the entire cutter is disposed in the bore.

After an impact in which the energy absorber 63 removes material from the wall of the bore 83, the retractor 32 may be replaced with a replacement retractor 32.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt retractor comprising:
   a spool rotatably connected with a base by a piston and a cylinder;
   the piston fixed to one of the base and the spool;
   the cylinder receiving the piston and fixed to the other of the base and the spool; and
   a cutter disposed between and fixed to one of the piston and the cylinder and in engagement with the other of the piston and the cylinder.

2. The seatbelt retractor of claim 1, further comprising:
   a housing with the spool rotatably coupled thereto for relative rotation of the spool thereto about an axis of rotation defined by the spool; and
   a base lock disposed between the base and the housing, the base lock in a first condition fixing the base to the housing.

3. The seatbelt retractor of claim 2, wherein the base lock includes:
   a plurality of clutching teeth disposed on an outer circumference of the base for rotation therewith; and
   an engagement tooth connected to the housing, the engagement tooth in the first condition being in engagement with the clutching teeth and the engagement tooth in a second condition being not in engagement with the clutching teeth,
   wherein engagement of the engagement tooth with the clutching teeth rotatably fixes the cylinder to the base.

4. The seatbelt retractor of claim 1, wherein the piston has piston threads and the cylinder includes a bore receiving the piston and cylinder threads are inside the bore and the piston threads and the cylinder threads are in threaded engagement with each other.

5. The seatbelt retractor of claim 4, wherein the piston threads are formed at a second end of the piston and the cutter is disposed on the piston between the piston threads and a first end of the piston.

6. The seatbelt retractor of claim 1, wherein the cutter is fixed to the piston and cuts the cylinder with relative rotation between the cylinder and the piston.

7. The seatbelt retractor of claim 6, wherein the cutter has a wedge-shaped cross section with a thinner first end disposed at the cylinder and a wider second end opposite the first end.

8. The seatbelt retractor of claim 1, wherein the cylinder is connected to the base and the piston is connected to the spool.

9. The seatbelt retractor of claim 8, wherein an end cap is rotatably fixed to the spool and to an end of the piston.

10. The seatbelt retractor of claim 9, wherein the end cap is rotatably supported by a spring cover.

11. The seatbelt retractor of claim 9, wherein the end cap has splines complementary to splines on the end of the piston.

12. The seatbelt retractor of claim 8, wherein the base has splines complementary to splines on an end of the cylinder.

13. A seatbelt retractor comprising:
    a spool rotatably connected with a base by an energy absorber;
    a housing with the spool rotatably coupled thereto for relative rotation of the spool thereto about an axis of rotation defined by the spool;
    a base lock disposed between the base and the housing, the base lock in a first condition fixing the base to the housing; and
    the energy absorber including:
      a piston fixed to one of the base and the spool,
      a cylinder receiving the piston and fixed to the other of the base and the spool, and
      a cutter disposed between and fixed to one of the piston and the cylinder and in engagement with the other of the piston and the cylinder.

14. The seatbelt retractor of claim 13, wherein the base lock includes:
    a plurality of clutching teeth disposed on an outer circumference of the base for rotation therewith; and
    an engagement tooth connected to the housing, the engagement tooth in the first condition being in engagement with the clutching teeth and the engagement tooth in a second condition being not in engagement with the clutching teeth,
    wherein engagement of the engagement tooth with the clutching teeth rotatably fixes the cylinder to the base.

15. The seatbelt retractor of claim 13, wherein the piston has piston threads and the cylinder includes a bore receiving the piston and cylinder threads are inside the bore and the piston threads and the cylinder threads are in threaded engagement with each other.

16. The seatbelt retractor of claim 15, wherein the piston threads are formed at a second end of the piston and the cutter is disposed on the piston between the piston threads and a first end of the piston.

17. The seatbelt retractor of claim 13, wherein the cutter is fixed to the piston and cuts the cylinder with relative rotation between the cylinder and the piston.

18. The seatbelt retractor of claim 17, wherein the cutter has a wedge-shaped cross section with a thinner first end disposed at the cylinder and a wider second end opposite the first end.

19. The seatbelt retractor of claim 13, wherein the cylinder is connected to the base and the piston is connected to the spool.

20. The seatbelt retractor of claim 19, wherein an end cap is rotatably fixed to the spool and to an end of the piston, and the end cap is rotatably supported by a spring cover.

* * * * *